United States P

[11] 3,619,028

| [72] | Inventors | Wayne H. Keene<br>Medfield;<br>Charles M. Sonnenschein, Natick, both of<br>Mass. |
|---|---|---|
| [21] | Appl. No. | 49,678 |
| [22] | Filed | June 25, 1970 |
| [45] | Patented | Nov. 9, 1971 |
| [73] | Assignee | Honeywell Inc.<br>Minneapolis, Minn. |

[54] FOURIER OPTICAL SCANNER
6 Claims, 6 Drawing Figs.

[52] U.S. Cl. ............................................. 350/7,
178/7.6, 250/236, 350/285
[51] Int. Cl. ....................................................... G02b 17/06
[50] Field of Search ............................................... 350/6, 7,
285; 250/236; 178/7.6

[56] References Cited
UNITED STATES PATENTS
2,023,217  12/1935  Benford.................... 350/6 X
3,226,721  12/1965  Gould....................... 350/6 X
3,378,687  4/1968  Schepler.................... 250/236 X
3,516,722  6/1970  Dusch....................... 350/6 X Primary Examiner—David Schonberg
Assistant Examiner—John W. Leonard
Attorneys—Milton D. Bartlett, Joseph D. Pannone, Jeffrey P. Morris and David M. Warren

ABSTRACT: An optical-scanning system comprising a series of paired scanning mirrors. In each pair of mirrors, the two mirrors are counterrotated about parallel axes and are tilted equally with respect to the axes whereby an incident beam of light is reflected by the two mirrors and emerges with a sinusodial oscillation. The paired mirrors are positioned so that the emerging beam from one pair of mirrors is incident upon the next pair of mirrors. The angles of tilt in the various pairs of mirrors are selected in accordance with Fourier coefficients so that the final emerging beam oscillates with any desired format such as a sawtooth scan.

3,619,028

FOURIER OPTICAL SCANNER

BACKGROUND OF THE INVENTION

This invention relates to optical and acoustic scanners which provide a line scan of an object, and more particularly to such scanners having an arbitrary scan format such as a sawtooth scanner.

Scanning systems, particularly optical scanners, have been utilized in the past to provide an image of an object by providing a sequence of line scans of the object. For example, an aircraft carrying such a line scanner may be utilized to provide a map of the terrain over which the aircraft is flying. In such an application the line scans are formed perpendicularly to the flight of the aircraft, and the forward motion of the aircraft provides a displacement between successive line scans. The composite image of the successive line scans provides the desired map of the terrain. In a similar manner an acoustic image of an extended sound source may be provided with an acoustic line scanner.

Optical scanners in the past have utilized mirrors which are moved in some form of rotary motion, such as by tilting, spinning, or carrying the mirror on a rotating frame. Rotating prisms and lenses have been utilized in place of the rotating mirrors. These rotating optical elements effect a scan by reflecting an incident beam of radiation through a time varying angle for directing rays from the various points of an object to the respective points of an image of the object.

A problem arises with such scanners in that the use of rotating elements frequently results in a nonlinear scan. For example, in the case of a mirror rotating at a uniform angular velocity about an axis lying in the plane of the mirror surface and reflecting an incident beam of light towards an image plane, the light beam is seen to pass across the image plane at a nonlinear rate (related to the tangent of the angle of rotation). In many scanning applications, particularly those wherein a high data rate is required, a linear scan format is most advantageous in that it permits a uniform data rate throughout the scanning interval. In other applications it may be advantageous to employ a scanning system which provides a prescribed nonlinear format as in the case of an extended object, such as a turbulent atmosphere or a region of smog, having various degrees of detail from one part of the object to the other.

It is, therefore, an object of the present invention to provide a scanning system with a prescribed scanning format.

It is also an object of the present invention to provide a scanning system having a substantially linear format.

SUMMARY OF THE INVENTION

The foregoing objects and other advantages are accomplished by a scanning system in accordance with the present invention which provides a series of sinusoidal line scanners. In one embodiment of the invention, a sinusoidal line scanner comprises a pair of mirrors which are counterrotated about parallel axes and are tilted equally with respect to the axes whereby an incident beam of light is reflected by the two mirrors and emerges with a sinusoidal oscillation. The sinusoidal line scanners are positioned so that the emerging beam from one sinusoidal line scanner is incident upon the next sinusoidal line scanner. The angles of tilt in the various sinusoidal line scanners are selected in accordance with Fourier coefficients so that the final emerging beam oscillates with any desired format such as a sawtooth scan.

BRIEF DESCRIPTION OF THE DRAWINGS

The aforementioned objects and other features of the invention are explained in the following description taken in connection with the accompanying drawings wherein.

DESCRIPTION OF THE PREFERRED EMBODIMENT

Figure 1:
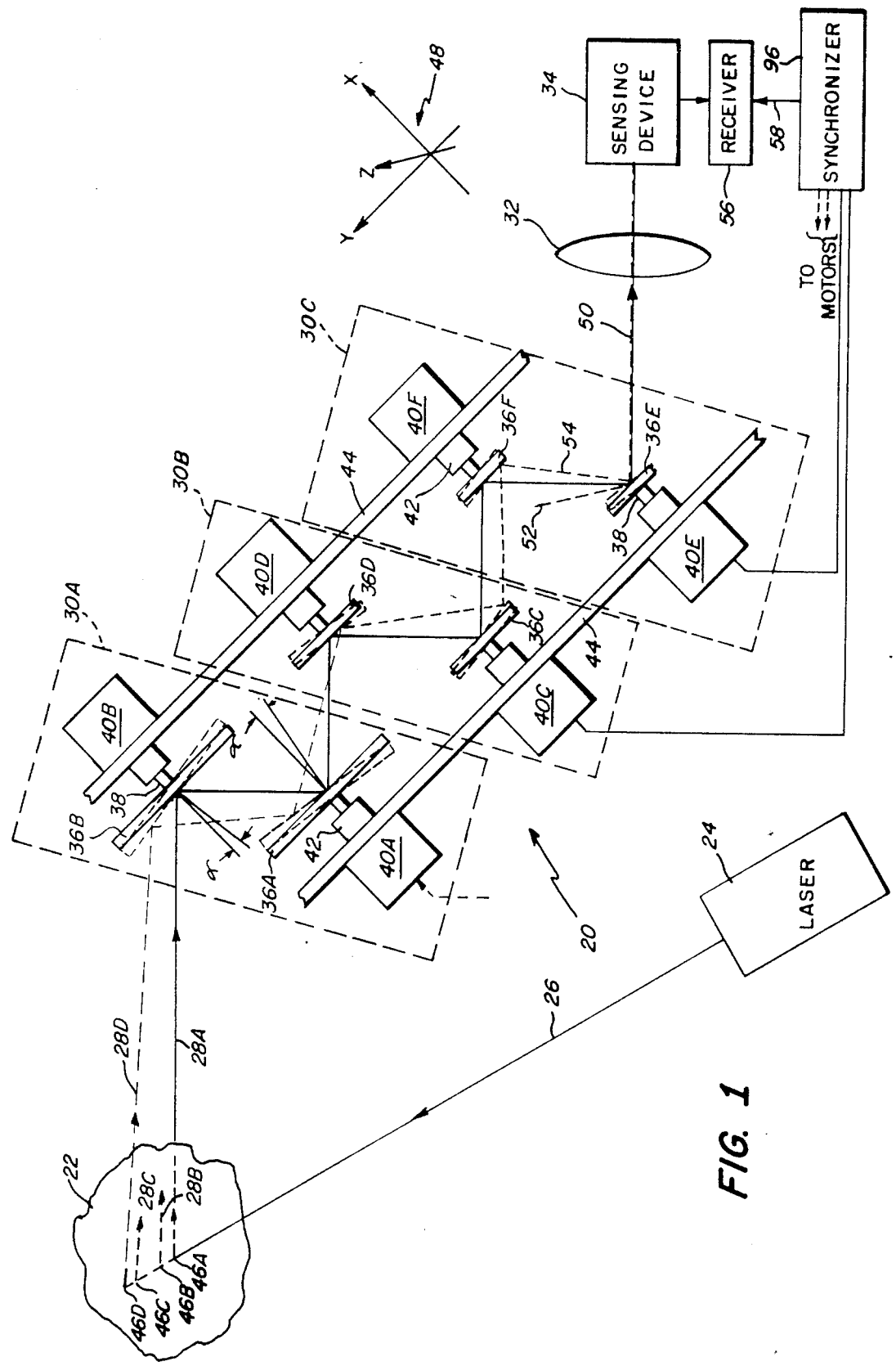
FIG. 1 is a diagrammatic representation of the optical system of the invention.

Referring now to FIG. 1, there is shown an optical system 20 in accordance with the invention which is utilized in the scanning of a region of smog 22 illuminated by a laser 24. A beam of light 26, represented diagrammatically in the figure by a line and arrow, is generated by laser 24 and is incident upon the region of smog 22. As the light passes through the region of smog 22, it reflects from various particles of smog as is indicated by light rays 28A-D which propagate toward the optical system 20. Two of these light rays, namely, light rays 28A and 28D are shown, respectively, by a solid line and a dashed line. The rays of light upon entering the optical system 20 pass through a plurality of line scanners 30A, B and C after which they are focused by a suitable focusing means, such as lens 32, upon a sensing device 34, which is responsive to the light from the line scanner 30A.

The line scanners 30A, B and C comprise a series of mirrors 36A-F, which are rotated about shafts 38, respectively, by motors 40A-F and are tilted about their respective shafts 38 by tilting mechanisms 42 which are described in further detail with reference to FIG. 2. The mirrors 36A-F are indicated diagrammatically by both solid lines and dotted lines, the solid lines representing the positions of the mirrors 36A-F at a zero angle of tilt, and the dotted lines representing these mirrors 36A-F at a nonzero angle of tilt. A tilt angle, $\alpha$, is shown in FIG. 1 for mirrors 36A and 36B, both mirrors having the same tilt angle $\alpha$. As shown, the tilt angle $\alpha$ is the angle formed by a normal through the surface of a mirror and the axis of its shaft 38. The motors 40A-F, shafts 38, and tilting mechanisms 42 are positioned by a support structure 44 so that the light rays 28A and 28D undergo successive reflections by the mirrors 36A-F.

The optical system 20 provides a scanning of object points such as points 46A-D of the region of smog 22 in a manner indicated by the successive reflections of light rays 28A and 28D between the mirrors 36A-F. When the mirrors 36A-F have zero-tilt angles, light ray 28A passes through the optical system 20 to impinge upon the sensing device 34. When the mirrors 36A-F have nonzero-tilt angles, a light ray such as light ray 28D passes through the optical system 20 to impinge on the sensing device 34, the final segment of ray 28D, between mirror 36E and sensing device 34, coinciding with the final segment of ray 28A as indicated by common beam 50. It is convenient to describe the reflections with the aid of a coordinate axis system 48 having mutually orthogonal X, Y and Z axes as shown in FIG. 1 with the Z-axis normal to the plane of the paper and in its positive sense extending upwardly from the paper. Mirrors 36E and 36F rotate in opposite directions about their respective shafts 38 having axes parallel to the X axis. Mirrors 36E and 36F rotate at equal speeds of rotation. The tilt angle of mirror 36E is equal to the tilt angle of mirror 36F, and this tilt angle is generally unequal to the tilt angle $\alpha$ described earlier with reference to mirrors 36A and 36B of the line scanner 30A. In a similar way the mirrors 36C and 36D of line scanner 30B rotate with equal speed but in opposite directions about axes parallel to the X axis and these two mirrors have equal tilt angles which are generally not equal to the tilt angles of the line scanners 30A and 30C. And similarly, the mirrors 36A and 36B of line scanner 30A rotate in opposite directions but with equal speed about axes parallel to the X-axis. The manner of selecting the various tilt angles as well as the mirror rotation speeds which differ for each of the three line scanners 30A, B and C will be described hereinafter.

In FIG. 1, the various tilt angles are shown exaggerated in order to facilitate an understanding of the optical system 20. Each of the line scanners 30A, B and C produce a sinusoidal line scan in a manner which is readily described by considering the operation of line scanner 30C. To observe the sinusoidal scan provided by line scanner 30C, it is convenient to imagine a light source, not shown, located at the position of the sensing device 34 and transmitting a light beam in the opposite direction of the common beam 50 to be incident upon mirror 36E. As mirror 36E rotates this beam is reflected and nutated through a conical surface, an axial section thereof being shown by ray 52 and a segment of ray 28D which is indicated by numeral 54. The axis of the conical surface lies in the XY-plane, where the XY designation is in reference to the coordinate axis system 48.

The rotations of mirrors 36E and 36F are synchronized to retain a phase relationship between these two rotations such that the positive Z-components of rays forming the conical surface are reflected by mirror 36F to produce negative Z-components of the same magnitude. In this way light rays passing from line scanner 30C to line scanner 30B lie within a single generally planar surface that is conveniently described as a plane which is parallel to the XY-plane and undergoes an oscillatory displacement in the Z-direction, the instantaneous value of the displacement being equal to the value of the Z-component of a ray. In other words the conical surface generated by light rays propagating between mirrors 36E and 36F of the line scanner 30C has been reformed into a planar surface as these same light rays propagate from line scanner 30C to line scanner 30B. It is also apparent that the instantaneous position of any one of these light rays is time dependent and, in particular, with reference to light rays forming the conical surface, the component of such a light ray in the XY-plane is seen to vary its angular orientation as a sinusoidal function of time at the rotation frequency of mirror 36E. This sinusoidal relationship is retained upon reflection of these light rays from mirror 36F due to the phase relationship between mirror 36F and 36E with the result that a sinusoidal scan pattern is seen to exist among light rays passing from line scanner 30C to line scanner 30B.

Continuing with the hypothetical example in which a light source, not shown, is imagined to be located at the position of the sensing device 34 and transmitting light in the direction of mirror 36E, it is apparent that light rays passing from line scanner 30C through line scanner 30B have undergone an additional scanning such that these light rays upon passing from line scanner 30B to line scanner 30A are now scanned in a format described by the sum of two sinusoidal scans, namely, the sinusoidal scan imparted by line scanner 30C plus a sinusoidal scan imparted by line scanner 30B. It is noted that the scanning of the light rays which pass between line scanners 30B and 30A is similarly generated within a plane which is parallel to the XY-plane and oscillates in the Z-direction (the oscillation being composed of contributions of the line scanners 30C and 30B.)

Continuing further with the hypothetical example in which a source of light is imagined to be located at the position of the sensing device 34 and transmitting light towards the mirror 36E, it is apparent that the light rays passing from line scanner 30A to the region of smog 22 similarly lie in a plane parallel to the XY-plane, such plane oscillating along the Z-axis.

The results obtained with the hypothetical example apply equally well to light incident upon the optical system 20 from the region of smog 22 since the optical system 20, as is well known, is reciprocal with respect to light passing from line scanner 30C to line scanner 30A, or from line scanner 30A to line scanner 30C. Accordingly, the common beam 50 at the output of line scanner 30C provides data sequentially from the points 46A-D of the region of smog 22, these points being essentially coplanar since they are not displaced by more than approximately one-half inch from the XY-plane in the case of a practical optical scanning system 20. Since the intensity of light reflected from the region of smog 22 varies among the various points 46A-D, the optical signal on the common beam 50 is modulated as the scanning procedure admits light sequentially from the points 46A-D thereby providing data relative to the smog. The optical signal on the common beam 50 is converted to an electrical signal by means of the sensing device 34 for processing by receiver 56 in accordance with well-known techniques wherein a reference signal on line 58, provided by the synchronizer of FIG. 3 as will be described hereinafter, is utilized to coordinate the optical signal with the instantaneous positions of the scanning mirrors.

It should be noted here, in passing, that the aforementioned oscillatory displacement of the scanning plane along the Z-axis can, in practice, be neglected since its amplitude is typically on the order of one-half inch and is negligible compared to the dimensions of the region of smog being scanned which region may be on the order of typically several hundred feet. It is also noted that this oscillation can be removed, if desired, by means of an alternative embodiment (not shown) which utilizes pairs of each of the line scanners 30A, 30B and 30C in which the line scanners in each pair of line scanners are phased to cancel out the oscillations of their respective scanning planes.

It is readily appreciated that the aforesaid reflections of light rays from the mirror surfaces are not restricted to optical radiation, but are equally applicable to other forms of radiant energy such as infrared radiation or even beams of acoustic energy, so long as the wavelength of the radiant energy is much smaller than the diameter of the mirror reflecting surface as is necessary to preserve the shape of the beam.

The line scan provided by the three line scanners 30A, B and C may be shown mathematically as a Fourier summation wherein the angular orientation of the scanning beam as a function of time, $f(t)$, is given up $$f(t) = a_o + \sum_{n=1}^{\infty} a_n \cos n\omega t + \sum_{n=1}^{\infty} b_n \sin n\omega t$$

where:

$$a_o = \frac{1}{T} \int_0^T f(t) dt$$

and represents an angular offset of the sensing device 34 from the common beam 50, this angular offset being normally zero, $$a_n = \frac{2}{T} \int_0^T f(t) \cos n\omega t\, dt$$

$$b_n = \frac{2}{T} \int_0^T f(t) \sin n\omega t\, dt$$

and $\omega = 2\pi F = 2\pi/T$ where $F$ is the rotation frequency of the shafts 38 of line scanner 30A. The Fourier frequency coefficient is $nF$ where $n=1, 2, 3$ respectively in the line scanners 30A, B and C giving rotation frequencies respectively $F$, $2F$ and $3F$. It is also possible to write $$f(t) = \sum_{n=1}^{\infty} C_n \cos(n\omega t + \varphi_n)$$

where $C_n$, a Fourier amplitude coefficient, is the angle of incidence in the line scanner and is equal to twice the tilt angle; for example $C_3$ in FIG. 1 is equal to $2\alpha$ for line scanner 30C. $C_n$ is given by:

$$C_n = \sqrt{a_n^2 + b_n^2}$$

The Fourier phase coefficient $\Phi_n$ is given by $$\varphi_n = \tan^{-1}\frac{b_n}{a_n}$$

Thus, the angle of tilt for the mirrors of the line scanners 30A, B and C are given respectively by $(C_1)/2$, $(C_2)/2$ and $(C_3)/2$. The rotation frequencies of the mirrors of the line scanners 30A, B and C are given respectively by $F$, $2F$ and $3F$ and the phases of the rotation are given respectively by $\Phi 1$, $\Phi 2$, and $\Phi 3$. By way of example, in FIG. 1 the line scanners 30A and 30C are shown in phase and line scanner 30B is shown out of phase, the $\Phi 1=\Phi 3=0$ and $\Phi 2=180°$.

As a convenience in the implementation of the optical system 20, the line scanners are arranged so that an incident ray of light, such as light ray 28A or 28D, is incident upon the line scanner having the largest tilt angle, herein tilt angle $\alpha$ of line scanner 30A. If an additional line scanner, not shown in the figures, operating at a rotation frequency of 4F is utilized, the tilt angles of its mirrors will have the smallest values as is generally the case with a convergent Fourier series, and accordingly such line scanner would be positioned between the lens 32 and line scanner 30C. In this way the beam of light passing through successive line scanners is reflected through small angles before being reflected through large angles and thereby impinges more nearly at the centers of the mirrors 36A-F. The mirrors 36A and 36B which have the largest tilt angles are made with the largest diameter reflecting surface so that they can accommodate an incident beam which impinges at a distance from the center of the mirror. The tilt angles are typically on the order of 178° to 3° Accordingly, $f(t)$ may be a substantially linear sawtooth scan, quadratic scan or other desired scan which is obtained by setting the mirror tilt angles, the mirror rotation speeds, and the mirror rotation phase angles in accordance with the appropriate Fourier coefficients for the scan desired. The accuracy of the scan format is increased by using additional line scanners; for example, four or even five line scanners may be utilized rather than only the three line scanners which are shown in FIG. 1. And, in those applications where only a coarse approximation is required, it may suffice to use only two line scanners.

Figure 2:
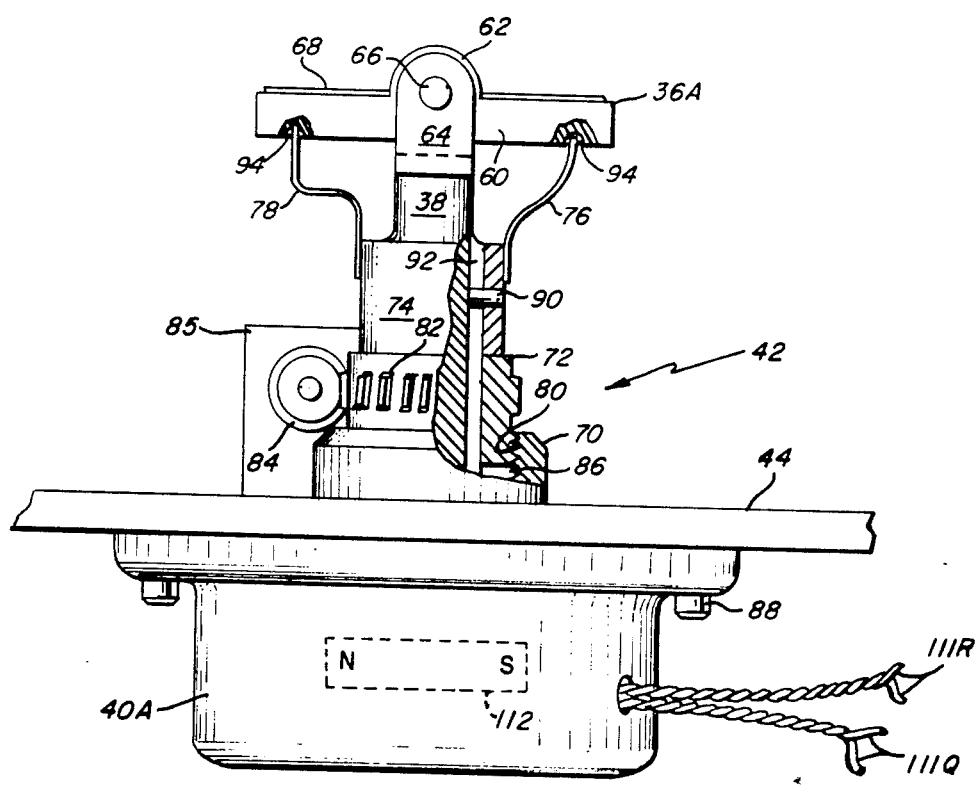
FIG. 2 is a mechanical drive and tilt unit for a scanning mirror of the invention.

Referring now to FIG. 2, there is shown a detailed view of the tilting mechanism 42 which tilts a mirror such as mirror 36A relative to the shaft 38 as the mirror 36A is rotated about the axis of shaft 38 by motor 40A. This description of FIG. 2 is equally applicable to mirrors 36B-F and motors 40B-F. Mirror 36A comprises a backing plate 60 having a pair of flanges 62, one of which is seen in FIG. 2, which are pivotally connected to an end fitting 64 on shaft 38 by means of pins 66, one of which is seen in FIG. 2. The mirror 36A further comprises a reflecting surface 68 which may be silvered. The axes of pins 66 lie in the plane of the reflecting surface 68 so that the mirror may be tilted about an axis lying within the reflecting surface 68. The tilting mechanism 42 comprises a bushing 70, a sleeve 72 and a collar 74 which surround and are coaxial with shaft 38. Push rods 76 and 78 are affixed at their lower ends to the collar 74 and contact the backing plate 60 for tilting mirror 36. Bushing 70 is affixed to the support structure 44 and is internally threaded to mate with an external thread 80 of sleeve 72. Sleeve 72 is provided with external teeth 82 in the manner of a gear for meshing with a worm drive 84 which is supported by a well known housing 85, partially shown in FIG. 2. Rotation of the worm drive 84 by either manual means or mechanical means, not shown, imparts a rotation to sleeve 72 about its axis and thereby imparts a displacement to sleeve 72 along this axis as the external thread 80 of sleeve 72 advances along an internal thread 86 of bushing 70. The displacement of sleeve 72 along the axis urges collar 74 along the axis thereby effecting the desired tilt to mirror 36A.

The motor 40A is affixed by means of bolts 88 to the support structure 44, and imparts a rotation to the shaft 38 independently of the rotation and translation of sleeve 72. Collar 74 is provided with a pin or key 90 which extends inwardly to mate with a slot or keyway 92 disposed along the outer surface of shaft 38 in a plane containing the axis of shaft 38. Rotation of shaft 38 is imparted to collar 74 by means of the key 90 and keyway 92 irrespectively of such displacement of collar 74 as is provided by the rotation of sleeve 72. A second key and keyway, not shown, similar to key 90 and keyway 92 is disposed diametrically opposite key 90 and keyway 92, respectively in collar 74 and shaft 38, to maintain balance of the shaft 38 and the collar 74 during their rotation.

Push rod 76 is relatively stiff and push rod 78 is relatively compliant and thereby acts as a spring to counterbalance the force of push rod 76 against the backing plate 60 of mirror 36A. (The bending of push rod 78 is shown exaggerated to indicate the compliancy.) The upper ends of push rods 76 and 78 are disposed within depressions 94 in the backing plate 60 which counteract the effect of centrifugal force during rotation of the collar 74 and mirror 36A to maintain the upper ends of push rods 76 and 78 in position. A displacement of collar 74 and of push rod 76 results in a tilting of mirror 36A as push rod 78 flexes to accommodate the tilting of the mirror 36A. The relative weights of the two push rods 76 and 78 are adjusted to maintain dynamic balance of the tilting mechanism 42 during rotation of the mirror 36.

Figure 3A:
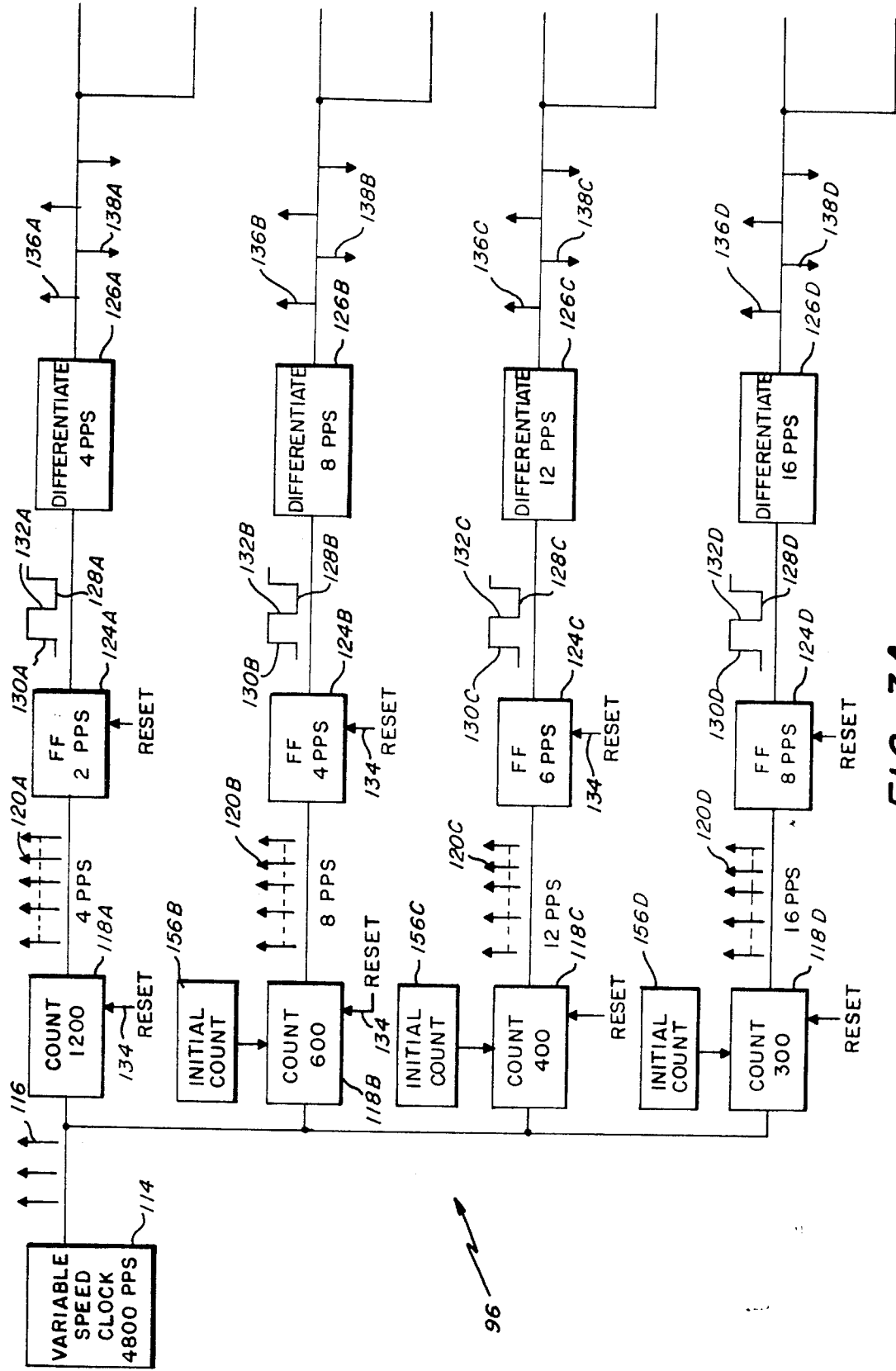
FIGS. 3A and 3B taken together is a block diagram of an electronic-synchronization system for synchronizing the rotation of scanning mirrors of the invention.
Figure 3B:
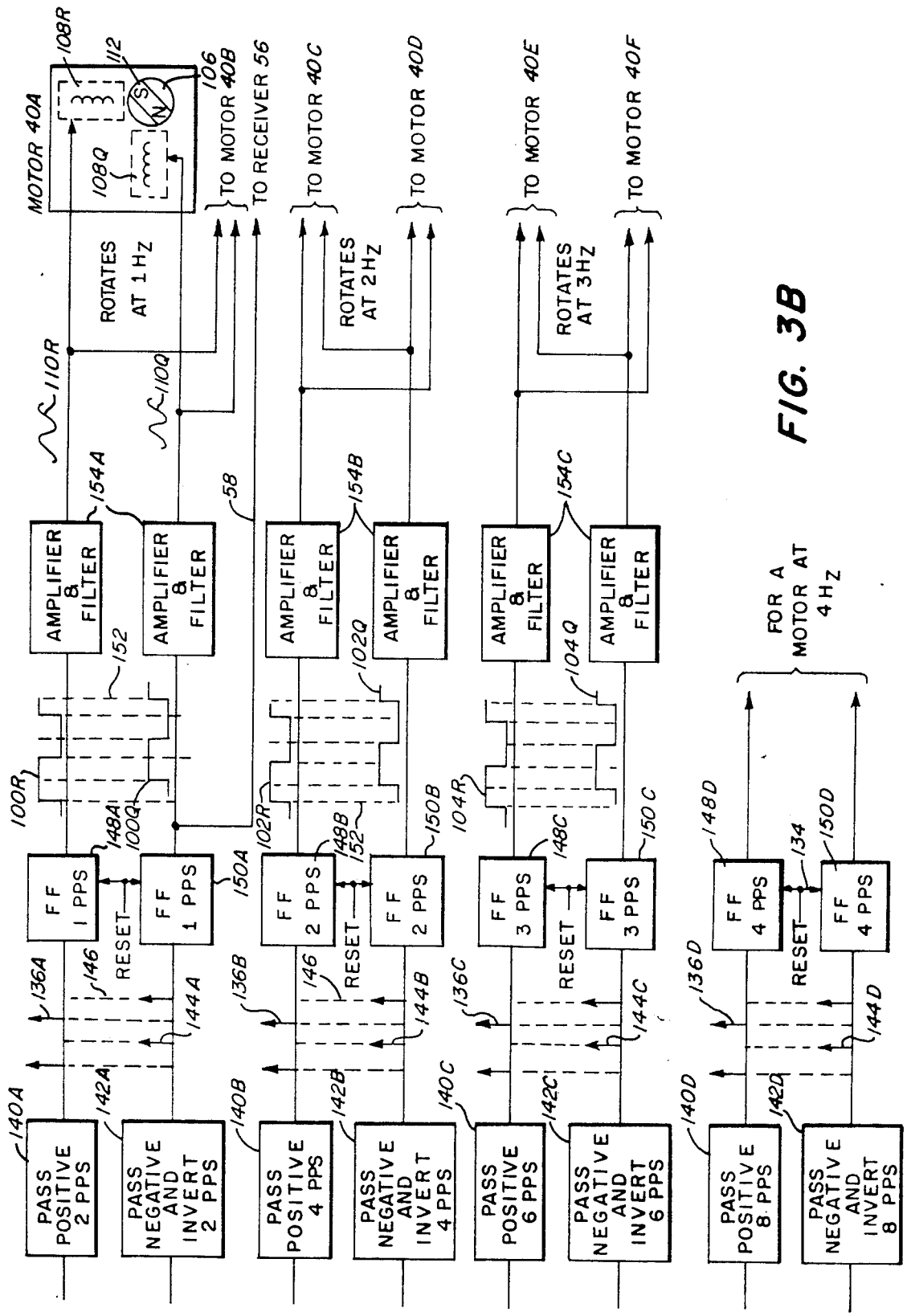

Referring now to FIGS. 3A and 3B there is shown a synchronizer 96 which provides electronic synchronization of the receiver 56 and the drive motors 40A-F of FIG. 1. The synchronizer 96 is a digital system providing a square wave output on line 58 for the receiver 56, and paired outputs of reference and quadrature square waves respectively 100R and 100Q for each of the motors 40A and 40B, 102R and 102Q for each of the motors 40C and 40D, and 104R and 104Q for each of the motors 40E and 40F. Each of the motors 40A-F are synchronous motors having a rotor 106, and reference and quadrature windings respectively 108R and 108Q which, when excited with reference and quadrature sinusoidal electric currents 110R and 110Q, produce in a well-known manner a rotating magnetic field which interacts with a magnetic field of the rotor 106 causing the rotor 106 to rotate in synchronism with the rotating magnetic field. Referring back momentarily to FIG. 2, the sinusoidal electric currents 110R and 110Q of FIG. 3 are applied to a motor such as motor 40A respectively by leads 111R and 111Q. The magnetic field of the rotor 106 is indicated schematically by a magnet 112 (also seen in FIG. 3B) in which the letters N and S denote respectively the North and South Poles. The magnet 112 in each of the motors 40A-F is aligned with the tilting mechanism 42, as shown by way of example in FIG. 2, such that the magnet 112 is perpendicular to the plane containing the axes of shaft 38 and pins 66. In this way the pivoting axis of each of the mirrors 36A-F is aligned with its respective magnet 112; and the rotations of the shafts 38 are synchronized by the synchronizer 96 of FIGS 3A and 3B.

Referring again to FIG. 3A the synchronizer 96 comprises a pulse generator, or clock 114, providing a train of pulses 116 at a pulse-repetition frequency of a desired value which is obtained by setting the clock 114 accordingly. A value of 4,800 pulses per second, as shown in FIG. 3A, has been selected as this is a convenient value for demonstrating how as many as four Fourier component rotational speeds can be provided. These Fourier component rotational speeds are shown in FIG. 3B as 1 Hz., 2 Hz., 3 Hz. and 4 Hz. The first three values being utilized for the motors 40A-F in the line scanners 30A, 30B and 30C, and an additional output at 4 Hz. for a pair of motors in an additional (optional) line scanner not shown in the figures.

The various square waves 100R and 100Q, 102R and 102Q, and 104R and 104Q are obtained from the train of pulses 116 by means of four counters 118A, B, C and D responsive to the pulses 116 and counting respectively to 1,200, 600, 400 and 300 of the input pulses 116 whereupon each of the counters 118A, B, C and D provides respectively the pulses 120A, B, C and D. Each of the counters 118A, B, C and D, upon completing their respective counts, recycle to zero and again begin their respective countings. As indicated in FIG. 3A, the pulses 120A occur at a rate of 4 pulses per second, the pulses 120B occur at a rate of 8 pulses per second, the pulses 120C occur at a rate of 12 pulses per second and the pulses 120D occur at a rate of 16 pulses per second.

The pulses 120A-D are applied respectively to flip-flops 124A-D and differentiators 126A-D. Each of the flip-flops 124A-D and each of the differentiators 126A-D function in a similar manner as may be understood from the operation of flip-flop 124A and differentiator 126A. Flip-flop 124A generates a square wave 128A wherein a positive change in voltage 130A and the next succeeding negative change in voltage 132A occur in response to successive pulses 120A. A reset 134 is provided for each of the flip-flops 124A-D so that each of the trains of square waves provided respectively by the flip-flops 124A-D being in phase. Thereafter, because the square waves of flip-flops 124A-D occur respectively at pulse-repetition frequencies of 2 pulses per second (p.p.s.), 4 p.p.s., 6 p.p.s. and 8 p.p.s., a cophasal relationship between them occurs once each second. The differentiator 126A, in response to the positive change in voltage 130A produces a positive pulse 136A, and, in response to the negative change in voltage 132A, produces a negative pulse 138A. The other differentiators 126B, C and D perform in an analogous manner to that of differentiator 126A.

Continuing with the description of the synchronizer 96, the differentiators 126A-D are connected respectively to gates 140A-D and to gates 142A-D, gates 140A-D passing only positive pulses such as pulses 136A, and gates 142A-D passing only negative pulses such as negative pulses 138A and furthermore inverting the negative pulses 138A to give a corresponding train of positive pulses 144A. Dashed lines 146 are provided in FIG. 3B to indicate the time relationship between the positive pulses 144A and the positive 136A and similarly with the positive pulses 136B-D and the positive pulses 144B-D.

The gates 140A-D are connected respectively to flip-flops 148A-D, and the gates 142A-D are connected respectively to flip-flops 150A-D. Flip-flops 148A-D and 150A-D are the same type flip-flop as flip-flop 124A and function in the similar manner. Thus, for example, the reference square wave 100R is produced by flip-flop 148A in response to the positive pulses 136A, and the quadrature square wave 100Q is produced by flip-flop 150A in response to the positive pulses 144A.

In FIG. 3B dashed lines 152 are shown to indicate the quadrature relationship between the reference and quadrature square waves respectively 100R and 100Q, 102R and 102Q and 104R and 104Q. These reference and quadrature square waves are then amplified and filtered by amplifiers 154A-C each of which has a band pass characteristic centered at the pulse repetition frequency of the respective reference and quadrature square waves 100R and 100Q, 102R and 102Q and 104R and 104Q. The band pass characteristic is selected to produce an output sinusoidal electric current by filtering out the third, fifth and higher order harmonics of the reference and quadrature square waves while introducing minimal phase shift at the pulse repetition frequency, or fundamental frequency, of the reference and quadrature square waves to retain the quadrature relationship between the sinusoidal electric currents, such as the sinusoidal electric currents 110R and 110Q.

The Fourier phase coefficients of the rotations of the mirrors in each of the line scanners 30A, B and C as well as for a fourth line scanner not shown in the figures is provided by the synchronizer 96 in the following manner. First it is noted that the rotation at the fundamental frequency, in line scanner 30A of FIG. 1 serves as a reference and, accordingly, its phase angle $\Phi_1$ may be zero for any scan format. The Fourier phase coefficients for the rotations of the mirrors in each of the remaining line scanners are provided in a manner similar to that which is now shown for line scanner 30B. In line scanner 30B the Fourier phase coefficients of the motors 40C and 40D are provided by the initial count 156B of FIG. 3A, counter 118B having been reset by reset 134 as indicated hereinafter. It is noted that a total of four pulses 120B occur for every single occurrence of a pulse of the reference square wave 102R, each pulse 120B representing therefore 90°, or one-quarter of the period, of the reference square wave 102R. Furthermore, it is noted that counter 118B counts 600 of the pulses 116 for each pulse 120B so that there is a total of 2,400 counts corresponding to a single period of the reference square wave 102R. Thus, for example, the time elapsed in counting 100 of the pulses 116 corresponds to one twenty-fourth of the period of the reference square wave 102R which corresponds to a Fourier phase angle of 15° at the motor rotation speed of 2 Hz. It is, therefore, readily seen that resetting the counter 118B to an initial count 156B of, for example 100, rather than to zero results in a fixed time delay of one twenty-fourth the period of the reference square wave 102R, as well as the quadrature square wave 102Q, with a corresponding phase angle of 15° for the rotor positions of motors 40C and 40D. In a similar way, counter 118C is reset by reset 134 to an initial count 156C, after which the counter recycles periodically to zero upon completion of the count of 400 of the pulses 116. Similar comments apply to the initial count 156D.

The preceding discussion of the synchronizer 96 has shown how rotation rates of 1 Hz., 2 Hz., 3 Hz., and 4 Hz. may be obtained. In a practical system it may be desirable to use rates such as 10 Hz. or even 100 Hz. for the fundamental frequency, with a corresponding increase in the rotation rates at the harmonic frequencies of the Fourier expansion, namely, 200 Hz., 300 Hz. and 400 Hz. corresponding to a 100-Hz.-fundamental frequency. These rotation frequencies are obtained by simply scaling the output pulse rate from the clock 114; thus increasing the clock rate to 48,000 p.p.s. provides an output fundamental rotation rate of 10 Hz. and increasing the output pulse rate of clock 114 to 480,000 p.p.s. provides an output fundamental rotation frequency of 100 Hz.

Figure 4:
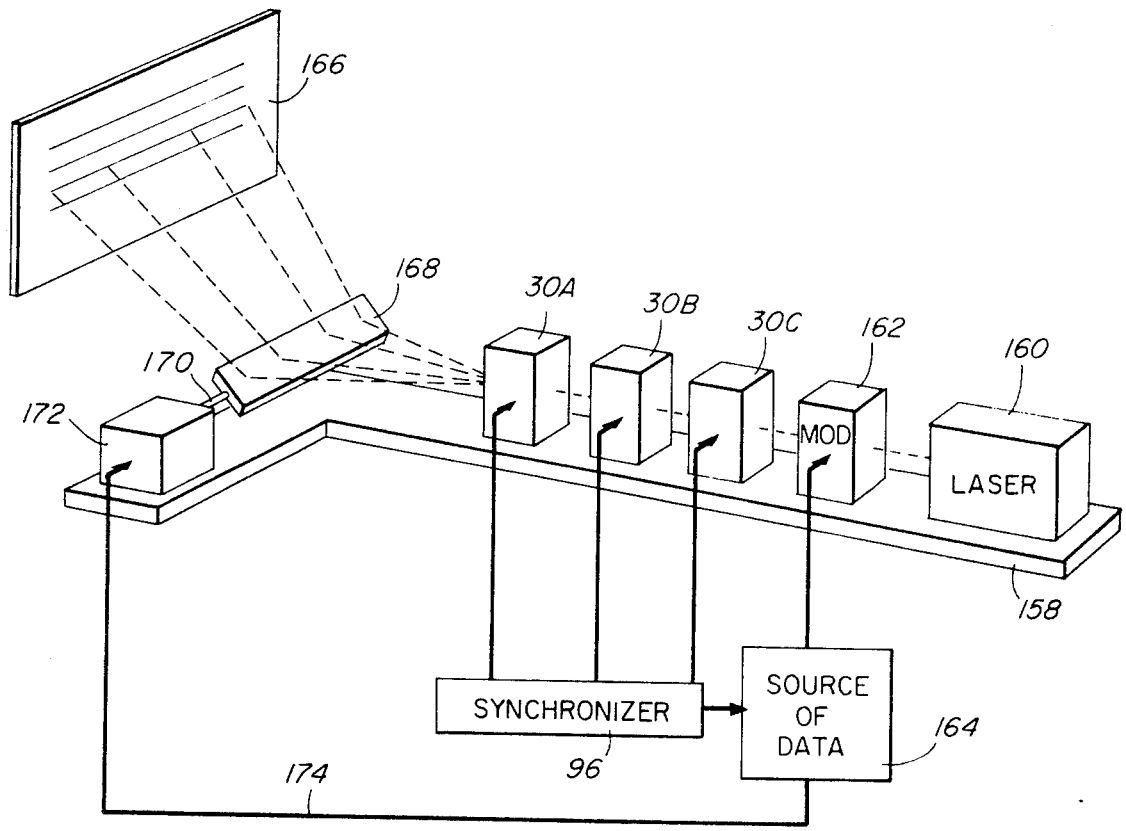
FIG. 4 is an isometric view, partially in diagrammatic form, of a raster scanner utilizing the optical system of the invention.
Figure 5:
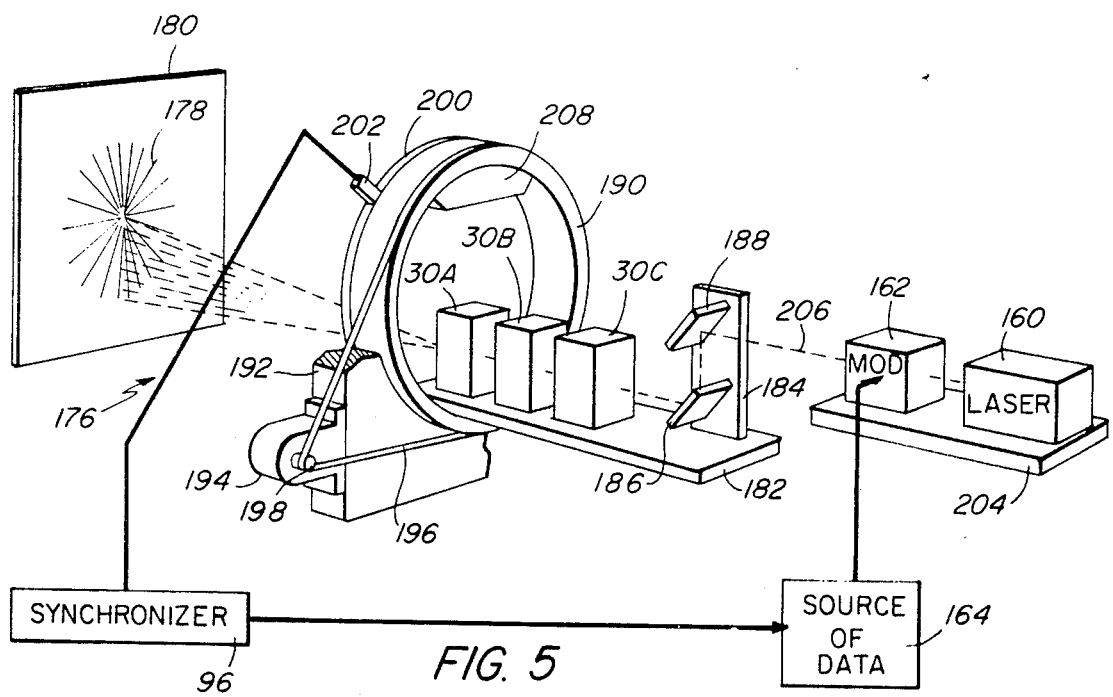
FIG. 5 is an isometric view, partially in diagrammatic form, of a radial scanner utilizing the optical system of the invention.

Referring now to FIGS. 4 and 5, there are shown two alternative means for utilizing the line scanners 30A, B and C to provide, respectively, a raster scan and a radial scan of the type used in Plan Position Indicators of radar systems. Thus in FIG. 4, there is shown the three line scanners 30A, B, and C mounted upon a frame 158 which also supports a laser 160 and a light modulator 162 which may be, for example, a Kerr cell. The Kerr cell 162 is driven by a source of data 164 shown diagrammatically in FIG. 4, which may be, for example, a computer or a radar-receiver system. The source of data 164, as well as the optical scanners 30A, B and C, are synchronized by the synchronizer 96 shown also in diagrammatic form. The raster scan is produced conveniently upon a screen 166 by means of a mirror 168 which pivots about a shaft 170, having an axis lying the plane of the scan lines emanating from line scanner 30A. Shaft 170 is supported and driven by a suitable drive means such as a stepping motor 172 responsive to signals on line 174 from the source of date 164.

Referring now to FIG. 5, there is shown a rotatable support structure 176 for rotating the line scanners 30A, B and C to provide a radial scan 178 upon a suitable surface such as screen 180. The rotatable support structure 176 comprises a frame 182 to which are affixed the three line scanners 30A, B and C and a strut 184 for supporting a pair of mirrors 186 and 188 in an optical alignment with the line scanner 30C. The frame 182 is affixed to a drum 190 which rotates within a housing 192, partially shown in FIG. 5, the drum 190 being driven from motor 194 by means of a belt 196 interconnecting the motor pulley 198 with the drum 190. The axis of drum 190 intersects the center of the radial scan 178. The optical axis of the line scanner 30A is offset from the axis of the drum 190, so that each individual line scan terminates at the center of the radial scan 178. Electrical connections with the rotating line scanners 30A, B and C may be made by any suitable means such as, for example, the sliprings 200 on the other periphery of the drum 190 and a brush assembly 202, partially shown in FIG. 5, which makes connections with the sliprings 200. The line scanners 30A, B and C are connected by electric wires, not shown, to the sliprings 200. A laser 160 and light modulator 162 are supported on a stationary frame 204 and provide a beam of light 206 which is coincident with the axis of drum 190 and impinges upon mirror 188. The beam of light 206 is reflected by mirror 188 onto mirror 186 and thence into the line scanner 30C. A counterweight 208 is affixed to the inner surface of drum 190 to dynamically balance the centrifugal forces resulting from the rotation of the line scanners 30A, B and C, the frame 182, the strut 184, and the two mirrors 186 and 188 about the axis of the drum 190. The remainder of the scanning system shown in FIG. 5 functions in the same manner as that of FIG. 4, namely, the synchronizer 96 and the source of data 164, both shown diagrammatically, are electrically connected with the line scanners 30A, B and C and with the light modulator 162. The light modulator 162 modulates the light in accordance with the data from the source of data 164 to provide the desired radial scan 178.

It is understood that the above described embodiments of the invention are illustrative only and that modifications thereof will occur to those skilled in the art. For example, prisms may be utilized in place of the mirrors, or additional reflecting surfaces for providing a folded optical path may be utilized within a line scanner to permit rotation of the optical elements about nonparallel axes. Accordingly, it is desired that this invention is not to be limited to the embodiment disclosed herein but is to be limited only as defined by the appended claims.

What is claimed is:
1. A scanning system comprising:
    a plurality of line scanners, each one of such scanners being responsive to a ray of radiant energy incident thereon to produce therefrom a sinusoidal scan of such energy;
    each line scanner including first and second optical elements mounted to rotate in opposite directions about parallel axes, the orientation of each optical element relative to its axis of rotation being adjustable;
    means for positioning each one of such plurality of line scanners to intercept such ray of radiant energy by a selected one of such scanners and to pass such ray serially through the remaining ones of such plurality of line scanners; and
    driving means for each one of the plurality of line scanners, each one of such driving means being adapted to drive its associated line scanner to produce a selected sinusoidal scan therefrom said driving means including synchronizer means for providing a rotation rate and a rotational phase angle to rotations of the first and second optical elements in each of the line scanners such that the rotation rates and the rotational phase angles are applied respectively to successive line scanners in accordance with the successive Fourier frequency coefficients and Fourier phase coefficients of a Fourier series, said orientations of the first and second optical elements relative to their axes of rotation in the respective line scanners being adjusted in accordance with the Fourier amplitude coefficients of the Fourier series so that the scans provided by successive line scanners sum together to provide a resultant scan in the manner of a Fourier summation.

2. The scanning system of claim 1 wherein each of the line scanners comprises:
    said first and second optical elements bring a first and a second reflecting surface;
    the first reflecting surface being rotatable about a first axis which is inclined at a first tilt angle relative to a normal to the first reflecting surface;
    the second reflecting surface being rotatable about a second axis which is inclined at a second tilt angle relative to a normal to the second reflecting surface;
    the first axis being oriented relative to the path of radiant energy such that a ray of radiant energy incident on the first reflecting surface is reflected into a nutating scan upon rotation of the first reflecting surface;
    the second axis being oriented relative to the path of radiant energy such that a ray of radiant energy incident on the second reflecting surface is reflected into a nutating scan upon rotation of the second reflecting surface; and
    the first and second reflecting surfaces being driven by the driving means and positioned relative to each other such that the nutating scan from the first reflecting surface is incident on the second reflecting surface.

3. The scanning system of claim 2 further comprising sensing means responsive to radiant energy exiting from one of the line scanners for providing a signal indicative of such energy, and receiver means responsive to the synchronizer means and to the sensing means for coordinating the signal with the rotations of the first and the second reflecting surfaces in each of the line scanners.

4. The scanning system of claim 2 further comprising rotator means for rotating the summation of line scans about an axis offset from the resultant scan to provide a radial scan.

5. The scanning system of claim 2 further comprising a mirror positioned within the path of radiant energy, and pivoting means for pivoting the mirror about an axis substantially parallel to the plane of the resultant scan to provide a raster scan.

6. The scanning system of claim 2 further comprising means for transmitting radiant energy toward an object for providing reflection of such radiant energy from the object toward the line scanners.

UNITED STATES PATENT OFFICE
CERTIFICATE OF CORRECTION

Patent No. 3,619,028    Dated November 9, 1971

Inventor(s) Wayne H. Keene and Charles M. Sonnenschein

It is certified that error appears in the above-identified patent and that said Letters Patent are hereby corrected as shown below:

Title Page, first column, lines 8 and 9, after "Assignee", delete "Honeywell Inc., Minneapolis, Minn." and insert therefor -- Raytheon Company, Lexington, Mass. --.

Column 3, line 3, indent "Each" (a new paragraph).

Column 4, line 36, delete "up" and insert therefor -- by --.

Column 4, line 67, before "line scanner" ad -- $n^{th}$ --.

Column 5, line 1, change "$\Phi_n$" to -- $\phi_n$ --.

Column 5, line 4, change "$_n$" to -- $\phi_n$ --.

Column 5, line 11, change "rotation" to -- rotations --.

Column 5, line 11, change "$\Phi 1, \Phi 2$" to -- $\phi_1, \phi_2$ --.

Column 5, line 12, change "$\Phi 3$" to -- $\phi_3$ --.

Column 5, line 14, change "the" to -- this --.

Column 5, line 14, change "$\Phi 1=\Phi 3=0$ and $\Phi 2=180°$" to -- $\phi_1=\phi_3=0$ and $\phi_2=180°$ --.

Column 5, line 32, change "178°" to -- 1/2° --.

Column 7, line 16, change "being" to -- begin --.

Column 7, line 34, before "136A" insert -- pulses --.

UNITED STATES PATENT OFFICE
CERTIFICATE OF CORRECTION

Patent No. 3,619,028    Dated November 9, 1971

Inventor(s) Wayne H. Keene and Charles M. Sonnenschein

It is certified that error appears in the above-identified patent and that said Letters Patent are hereby corrected as shown below:

Column 7, line 69, change "$\Phi_1$" to -- $\phi_1$ --.

Column 8, line 52, after "lying" insert -- in --.

Column 8, line 54, change "date" to -- data --.

Column 8, line 73, change "other" to -- outer --.

Signed and Sealed this thirteenth Day of April 1976

[SEAL]

Attest:

RUTH C. MASON
Attesting Officer

C. MARSHALL DANN
Commissioner of Patents and Trademarks